March 18, 1952     O. R. BROWN     2,589,333
TOY HOISTING TRUCK
Filed Aug. 2, 1946     3 Sheets-Sheet 1
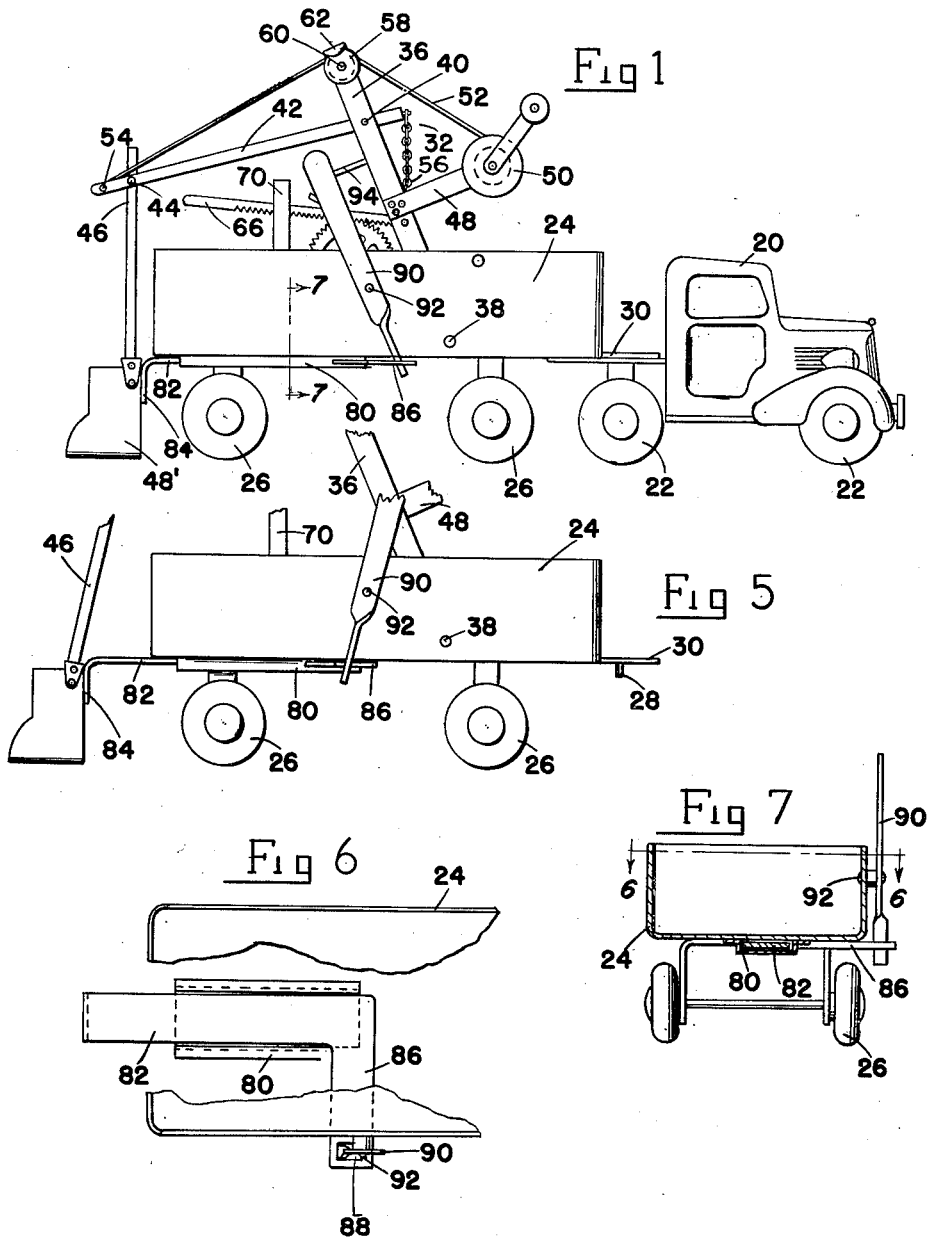
*INVENTOR.*
ORVILLE R. BROWN
ATTORNEYS March 18, 1952 — O. R. BROWN — 2,589,333
TOY HOISTING TRUCK
Filed Aug. 2, 1946 — 3 Sheets-Sheet 2
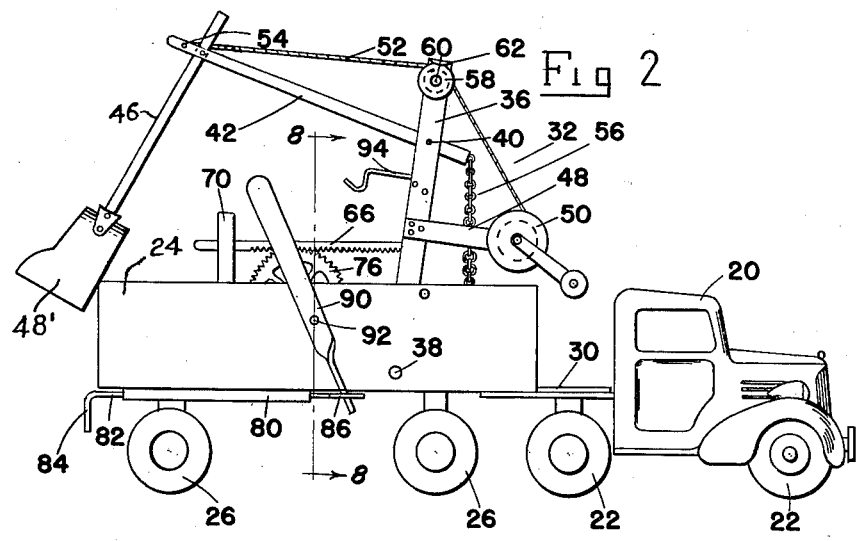
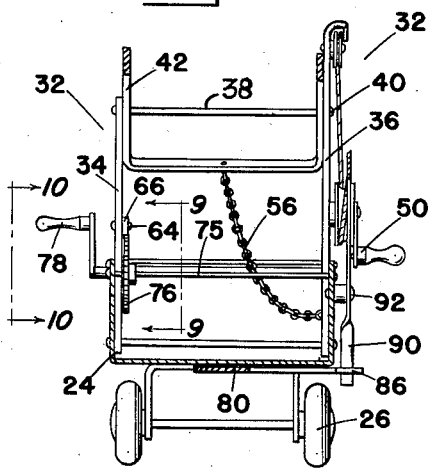
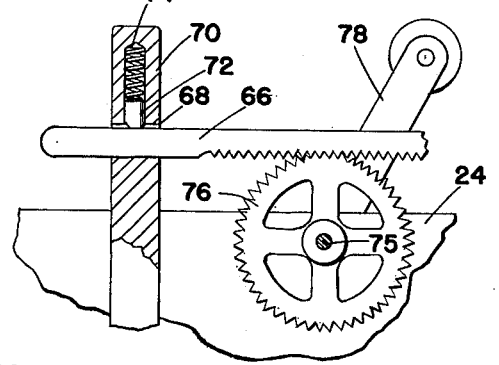
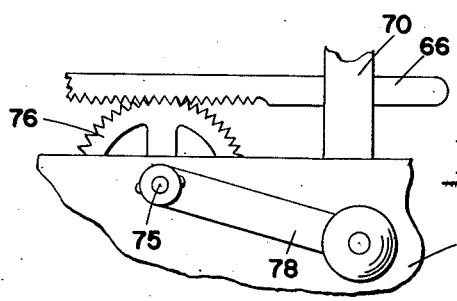
*INVENTOR.*
ORVILLE R. BROWN
BY *Victor J. Evans & Co.*
ATTORNEYS March 18, 1952  O. R. BROWN  2,589,333
TOY HOISTING TRUCK
Filed Aug. 2, 1946  3 Sheets-Sheet 3
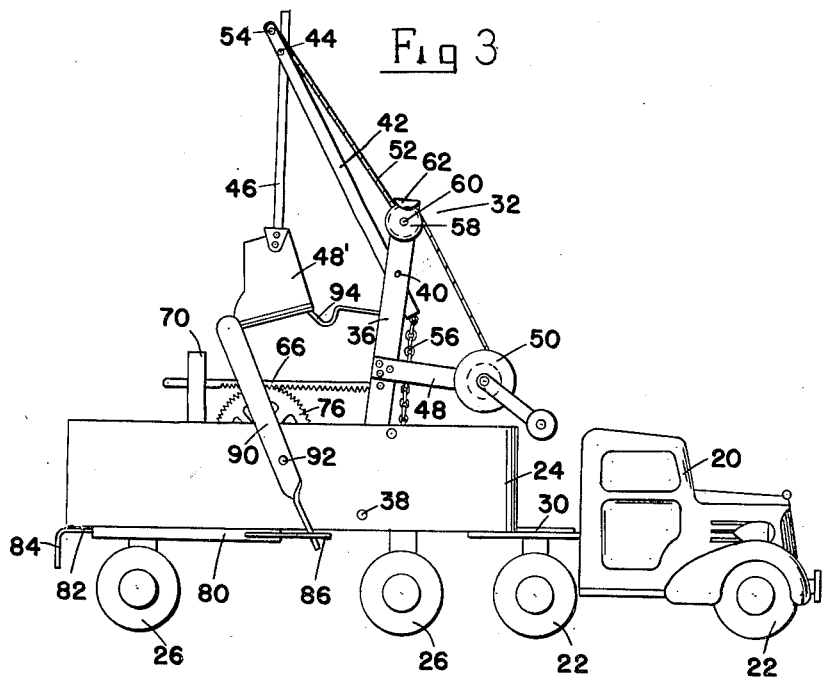
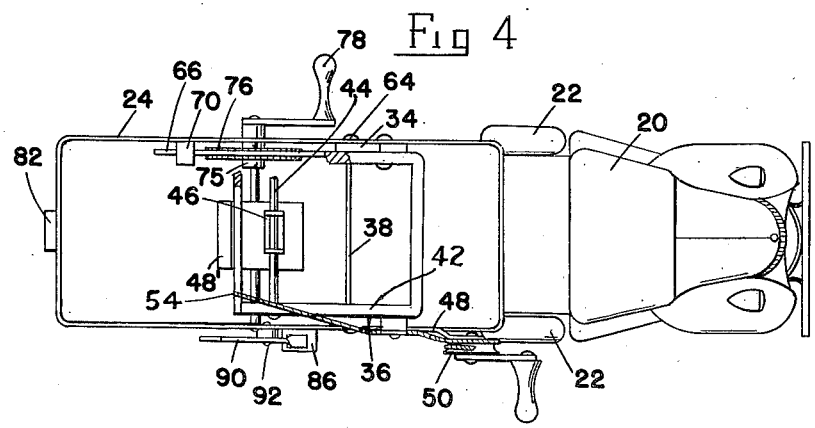
*INVENTOR.*
ORVILLE R. BROWN
BY *Victor J. Evans & Co.*
ATTORNEYS Patented Mar. 18, 1952

2,589,333

UNITED STATES PATENT OFFICE 2,589,333

TOY HOISTING TRUCK

Orville R. Brown, Danville, Ill.

Application August 2, 1946, Serial No. 688,042

1 Claim. (Cl. 46—40)

This invention relates to a toy hoisting truck which is constructed in such a manner that it can be loaded by means of a shovel secured to and within the sidewall of the truck.

An object of this invention is to provide a toy truck that will simulate a full sized derrick shovel and can be used to hoist material from the floor or ground for disposition in the body of the truck.

Another object of the invention is to provide a toy that will afford a great deal of fun to children, is sturdily constructed, easy to operate and can be manufactured at a low cost.

With the above and other objects and advantages in view, the invention consists of the novel details of construction, arrangement and combination of parts more fully hereinafter described, claimed and illustrated in the accompanying drawings in which:

Figure 1 is an elevational view of an embodiment of the invention with the shovel in loading position;

Figure 2 is the same, with the shovel being hoisted;

Figure 3 is the same, with the shovel in dumping position;

Figure 4 is a top plan view partly broken away;

Figure 5 is a detached view of the trailer;

Figure 6 is a sectional view on the line 6—6 of Figure 7;

Figure 7 is a sectional view on the line 7—7 of Figure 1 with parts omitted;

Figure 8 is a sectional view on the line 8—8 of Figure 2;

Figure 9 is a sectional view on the line 9—9 of Figure 8 and

Figure 10 is a sectional view on the line 10—10 of Figure 8.

Referring more in detail to the drawings, the reference numeral 20 designates the truck cab having wheels 22 to which the trailer 24 also having wheels 26 is connected by means of the pin 28 on the tongue 30 of the trailer 24.

A crane 32 comprises bars 34 and 36 respectively, which are pivotally connected to the sides of the trailer by the pin shaft 38. Pivotally mounted at the points 40 of the bars 34 and 36 is the U-shaped jib lift 42 and the outer ends of the lift are provided with a pin shaft 44 on which is pivotally mounted at the center thereof the shovel boom 46 on the end of which is pivotally mounted the shovel 48'. Secured to bar 36 is a rearwardly extending hoisting pulley bracket 48 on which is mounted at its outer end the hoisting pulley and crank 50 over which is trained the cable 52 which is connected to the lift 42 at 54, and rotation of the crank 50 will raise and lower the boom 46, the downward movement of the boom 46 about the pivot 49 is limited by a chain 56 connected to the lift 42 and the side of the trailer. The cable 52 passes over a pulley 58, rotatably mounted at 60 on the bar 36 which extends upwardly beyond the lift 42 and is turned upon itself at 62 to provide a guide for retaining the cable on the pulley 58.

Secured to the arm 34 by a pivot pin 64 is the rack 66 which is slidably mounted at its free end in the seat 68 in the rack guide 70 vertically secured to one side of the trailer, and a spring pressed pressure lug 72 is mounted in the vertical seat 74 in the guide 70 for engagement with the rack 66.

Mounted for engagement with the rack 66 on the sides of the trailer by means of the shaft 75 is a gear 76 having a hand crank 78 for the manipulation thereof, and rotation of the crank 78 will cause the bars 34 and 36 to be moved on their respective pivots from normal to loading position and back to normal again.

Mounted longitudinally of the bottom of the trailer, adjacent the rear end thereof, is the shovel loading slide bar housing 80 in which is movably mounted the shovel loading slide bar 82 having the vertical depending arm 84 for engagement with the shovel 48 during the shovel loading operation, and the right angularly extending horizontal arm 86 having the apertured end 88 by reception of the lower end of the shovel loading lever 90 which is pivotally mounted on the side of the trailer at 92.

Secured to bar 36 for engagement with the bucket 48 during the dumping operation, is the shovel dumping bracket 94.

In operation, the toy is shown in normal position in Figure 3 with the shovel 48 resting on the bracket 94. Crank 78 is then rotated so that the crane and shovel are moved toward the rear of the truck as shown in Figure 1, then crank 50 is rotated to lower the shovel 48 to the position shown in Figure 1. Then the lever 90 is pulled forward, causing the slide bar 82 to move rearwardly of the trailer 24 and engage the shovel through the medium of the arm 84 which moves the shovel outwardly as shown in Figure 5 for the loading thereof. This will fill the shovel with the material being used. The lever 90 is then reversed, and crank 50 is rotated, lifting the shovel upwardly. Then crank 78 is rotated until the shovel rests on bracket 94. By reversing the crank 50 the shovel will dump the contents in the trailer and it is again ready for reloading, at which time the loading steps are repeated as desired.

Thus there has been provided a toy that is amusing as well as educational, and it is believed that the construction and operation thereof will be apparent to those skilled in the art. It is also to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A toy of the character described, comprising a truck cab, a trailer connected to said truck, said trailer having a bottom and sides outlining the marginal edge of the bottom, a hoisting means mounted within the sides of the trailer and secured to the sides of the trailer comprising a crane, a lift on said crane and a boom on said lift, a shovel on the boom, means on the crane cooperating with the shovel for the dumping thereof when the shovel has been moved upwardly by the hoisting apparatus, means slidably carried by the trailer, manually operated means pivotally mounted on the side of the trailer and coacting with said last means to move said means into engagement with the shovel when the shovel has been lowered by the hoisting apparatus for the loading of the shovel.

ORVILLE R. BROWN.

REFERENCES CITED

The following references are of record in the file of this patent:

UNITED STATES PATENTS

| Number | Name | Date |
|---|---|---|
| 716,538 | Harrison | Dec. 23, 1902 |
| 830,783 | Groesbeck | Sept. 11, 1906 |
| 1,285,058 | Dages et al. | Nov. 19, 1918 |
| 1,302,857 | Sabina | May 7, 1919 |
| 1,685,707 | Keedy | Sept. 25, 1928 |
| 1,857,302 | Hawkins | May 10, 1932 |
| 2,311,123 | Osborne | Feb. 16, 1943 |
| 2,387,687 | Smith | Oct. 23, 1945 |